US010227508B2

(12) United States Patent
Kim et al.

(10) Patent No.: US 10,227,508 B2
(45) Date of Patent: *Mar. 12, 2019

(54) PRESSURE-SENSITIVE ADHESIVE COMPOSITION

(71) Applicant: LG Chem, Ltd., Seoul (KR)

(72) Inventors: Kee Young Kim, Daejeon (KR); No Ma Kim, Daejeon (KR); In Ho Hwang, Daejeon (KR); In Kyu Park, Daejeon (KR)

(73) Assignee: LG Chem, Ltd. (KR)

( * ) Notice: Subject to any disclaimer, the term of this patent is extended or adjusted under 35 U.S.C. 154(b) by 54 days.

This patent is subject to a terminal disclaimer.

(21) Appl. No.: 14/574,625

(22) Filed: Dec. 18, 2014

(65) Prior Publication Data
US 2015/0099114 A1 Apr. 9, 2015

Related U.S. Application Data

(63) Continuation of application No. PCT/KR2014/005443, filed on Jun. 19, 2014.

(30) Foreign Application Priority Data

Jun. 19, 2013 (KR) .................. 10-2013-0070504
Jun. 19, 2013 (KR) .................. 10-2013-0070512

(51) Int. Cl.
C09J 133/08 (2006.01)
C09J 9/02 (2006.01)
G02B 1/18 (2015.01)
C09J 133/06 (2006.01)
C09J 133/14 (2006.01)
C08K 5/3435 (2006.01)
C09J 11/06 (2006.01)
G02B 1/10 (2015.01)
H04B 1/3888 (2015.01)
G02B 1/14 (2015.01)
G02B 1/16 (2015.01)
C09J 7/38 (2018.01)

(52) U.S. Cl.
CPC .............. C09J 9/02 (2013.01); C08K 5/3435 (2013.01); C09J 7/385 (2018.01); C09J 11/06 (2013.01); C09J 133/066 (2013.01); C09J 133/08 (2013.01); C09J 133/14 (2013.01); G02B 1/105 (2013.01); G02B 1/14 (2015.01); G02B 1/16 (2015.01); G02B 1/18 (2015.01); H04B 1/3888 (2013.01); C09J 2201/122 (2013.01); C09J 2201/128 (2013.01); C09J 2201/606 (2013.01); C09J 2203/318 (2013.01); C09J 2433/00 (2013.01); G02F 2202/28 (2013.01); Y10T 428/1462 (2015.01); Y10T 428/2848 (2015.01); Y10T 428/2887 (2015.01); Y10T 428/2891 (2015.01); Y10T 428/31935 (2015.04); Y10T 428/31938 (2015.04)

(58) Field of Classification Search
None
See application file for complete search history.

(56) References Cited

U.S. PATENT DOCUMENTS

| | | | |
|---|---|---|---|
| 5,322,861 A | 6/1994 | Tsuge et al. | |
| 6,441,092 B1 | 8/2002 | Gieselman | |
| 7,887,914 B2* | 2/2011 | Kobayashi | ............. C09J 7/0217 156/332 |
| 2002/0085284 A1* | 7/2002 | Nakamura | ............... G02B 1/11 359/601 |
| 2003/0124346 A1 | 7/2003 | Yamanaka et al. | |
| 2005/0244633 A1 | 11/2005 | Kobayashi et al. | |
| 2006/0024494 A1 | 2/2006 | Amano et al. | |
| 2006/0057368 A1 | 3/2006 | Kobayashi et al. | |
| 2006/0207722 A1 | 9/2006 | Amano et al. | |
| 2007/0238805 A1 | 10/2007 | Maeda et al. | |
| 2008/0311395 A1 | 12/2008 | Ukei et al. | |
| 2009/0065140 A1* | 3/2009 | Osoegawa | ............ C08F 290/06 156/275.5 |
| 2009/0104445 A1 | 4/2009 | Inoue et al. | |
| 2009/0163626 A1 | 6/2009 | Ukei et al. | |

(Continued)

FOREIGN PATENT DOCUMENTS

CN 1693401 A 11/2005
CN 1749344 A 3/2006
(Continued)

OTHER PUBLICATIONS

Nana, Nishitsuji et al., "Pressure-Sensitive Adhesive Agent Composition for Surface Protecting Sheet, and Surface Protecting Sheet Using the Same", English translation of JP2008-248223A, Oct. 16, 2008.*

(Continued)

Primary Examiner — Anish P Desai
(74) Attorney, Agent, or Firm — Lerner, David, Littenberg, Krumholz & Mentlik, LLP

(57) ABSTRACT

Provided are a pressure-sensitive adhesive composition, a protective film, an optical device, and a display device. The pressure-sensitive adhesive composition may exhibit excellent storage stability, suitable low speed and high speed peel-off strengths after a crosslinking structure is formed, and have an excellent balance between them. Accordingly, the pressure-sensitive adhesive composition may exhibit an excellent protective effect when applied to a protective film, may be easily peeled in high speed peel-off and thus advantageous for a high speed process, and may exhibit an excellent antistatic property in the process.

9 Claims, No Drawings

(56) References Cited

U.S. PATENT DOCUMENTS

| | | | |
|---|---|---|---|
| 2009/0275705 A1 | 11/2009 | Fujita et al. | |
| 2009/0317635 A1 | 12/2009 | Amano et al. | |
| 2010/0238384 A1 | 9/2010 | Tochigi et al. | |
| 2011/0007244 A1* | 1/2011 | Kim | C08G 18/6229 349/96 |
| 2011/0187970 A1* | 8/2011 | Kim | C08F 220/18 349/96 |
| 2012/0320317 A1 | 12/2012 | Yoon et al. | |
| 2012/0328800 A1 | 12/2012 | Yoon et al. | |
| 2013/0029146 A1 | 1/2013 | Takashima et al. | |
| 2013/0085215 A1* | 4/2013 | Shitara | C09J 7/0217 524/100 |
| 2013/0211028 A1* | 8/2013 | Shinike | G06F 3/044 526/307.5 |
| 2013/0224436 A1 | 8/2013 | Kim et al. | |
| 2014/0016067 A1 | 1/2014 | Yoon et al. | |
| 2014/0016069 A1 | 1/2014 | Kim et al. | |
| 2014/0178608 A1 | 6/2014 | Yoon et al. | |
| 2014/0220264 A1* | 8/2014 | Park | C09J 133/14 428/1.55 |
| 2015/0093569 A1 | 4/2015 | Chi et al. | |
| 2015/0099114 A1 | 4/2015 | Kim et al. | |
| 2016/0376480 A1 | 12/2016 | Bae et al. | |
| 2017/0260423 A1 | 9/2017 | Son et al. | |

FOREIGN PATENT DOCUMENTS

| | | | |
|---|---|---|---|
| CN | 101910346 A | 12/2010 | |
| CN | 102096139 A | 6/2011 | |
| CN | 102482550 A | 5/2012 | |
| CN | 102516902 A | 6/2012 | |
| CN | 102746811 A | 10/2012 | |
| CN | 103003379 A | 3/2013 | |
| CN | 103820059 A | 5/2014 | |
| EP | 1323802 A2 | 7/2003 | |
| EP | 1621596 A2 | 2/2006 | |
| EP | 2484734 A2 | 8/2012 | |
| EP | 2677015 A2 | 12/2013 | |
| JP | 1993-140519 | 6/1993 | |
| JP | 05140519 A | 6/1993 | |
| JP | H10298491 A | 11/1998 | |
| JP | 2003183612 A | 7/2003 | |
| JP | 2007217441 A | 8/2007 | |
| JP | 2008248223 A | 10/2008 | |
| JP | 2008280375 A | 11/2008 | |
| JP | 2011037929 A | 2/2011 | |
| JP | 2011-225732 A | 11/2011 | |
| JP | WO 2012023567 A1 * | 2/2012 | G06F 3/044 |
| JP | 2012-184434 A | 9/2012 | |
| JP | 2013107978 A | 6/2013 | |
| JP | 2014098128 A | 5/2014 | |
| JP | 2014196377 A | 10/2014 | |
| KR | 20000009647 A | 2/2000 | |
| KR | 20000018983 A | 4/2000 | |
| KR | 20000019116 A | 4/2000 | |
| KR | 20010111362 A | 12/2001 | |
| KR | 20020008267 A | 1/2002 | |
| KR | 20020066505 A | 8/2002 | |
| KR | 20030068335 A | 8/2003 | |
| KR | 20040030919 A | 4/2004 | |
| KR | 20040083916 A | 10/2004 | |
| KR | 20040085484 A | 10/2004 | |
| KR | 20060128659 A | 12/2006 | |
| KR | 20070100170 A | 10/2007 | |
| KR | 20070101001 A | 10/2007 | |
| KR | 20080005722 A | 1/2008 | |
| KR | 20080063107 A | 7/2008 | |
| KR | 20080101801 A | 11/2008 | |
| KR | 20090049557 A | 5/2009 | |
| KR | 20110095004 A | 8/2011 | |
| KR | 20110095464 A | 8/2011 | |
| KR | 20110095820 A | 8/2011 | |
| KR | 20120060782 A | 6/2012 | |
| KR | 2012-0109398 A | 10/2012 | |
| KR | 2012-0109411 A | 10/2012 | |
| KR | 20120110032 A | 10/2012 | |
| KR | 20130013995 A | 2/2013 | |
| KR | 2013-0023183 A | 3/2013 | |
| KR | 20130056169 A | 5/2013 | |
| KR | 20130058761 A | 6/2013 | |
| TW | 200613492 | 5/2006 | |
| TW | 201127926 A | 8/2011 | |
| TW | 201309769 A | 3/2013 | |
| WO | 2007029644 A1 | 3/2007 | |
| WO | 2009091171 A2 | 7/2009 | |
| WO | 2011027707 A1 | 3/2011 | |
| WO | 2012064071 A2 | 5/2012 | |
| WO | 2012128596 A2 | 9/2012 | |
| WO | WO 2013095064 A1 * | 6/2013 | C09J 133/14 |

OTHER PUBLICATIONS

Product data sheet "Triethylene glycol methyl ether methacrylate", Sigma-Aldrich, Jun. 26, 2017.*

Product data sheet "(2-Methoxyethyl) acrylate", Sigma-Aldrich, Jun. 29, 2017.*

Office Action from corresponding Taiwan Application No. 103121217, dated Jul. 6, 2015.

Office Action from corresponding Taiwanese Application No. 103121218, dated Jul. 6, 2015.

International Search Report for Application No. PCT/KR2014/005446 dated Sep. 24, 2014.

International Search Report from PCT/KR20141005443 dated Sep. 24, 2014.

International Search Report from PCT/KR20141005442, dated Sep. 24, 2014.

Office Action from corresponding Chinese Application No. 201480002469.7, dated Nov. 23, 2015.

Extended search report from European Application No. 14813992.6, dated Feb. 23, 2016.

IPO Search Report from Taiwan Application No. 103121220, dated Mar. 16, 2016.

Office Action from Chinese Application No. 201480002449.X dated Oct. 28, 2015.

Office Action from Chinese Application No. 201480002466.3, dated Oct. 30, 2015.

Product data sheet "Tinuvin 765" from BASF, Jul. 2011.

Product data sheet "4-Hydroxybutyl acrylate" from Sigma-Aldrich, retrieved Dec. 21, 2015.

Product data sheet "2-Hydroxyethyl acrylate" from Sigma-Aldrich, retrieved Dec. 21, 2015.

Nishitsuji, Nama et al., "Pressure-Sensitive Adhesive Composition for Use in Surface Protecting Sheet, and Surface Protecting Sheet Using the Same", machine translation of JP 2008-248223A, Oct. 16, 2008.

Extended Search Report from European Application No. 14814057.7, dated Apr. 18, 2016.

XP-002756139, Database WPI, Thomson Scientific, London, GB (2013), Week 39.

Extended search report from European Application No. 14813735.9, dated May 19, 2016.

Kazuhiro, Sakaguchi et al., "Pressure Sensitive Adhesive Composition for Surface Protective Film", English translation of JP2008-280375A, published on Nov. 20, 2008.

* cited by examiner

PRESSURE-SENSITIVE ADHESIVE COMPOSITION

CROSS-REFERENCE TO RELATED APPLICATIONS

The present application is a continuation of International Application No. PCT/KR2014/005443 filed on Jun. 19, 2014, which claims the benefit of Korean Patent Application No. 10-2013-0070512, filed on Jun. 19, 2013 and Korean Patent Application No. 10-2013-0070504, filed on Jun. 19, 2013, the disclosures of which are incorporated herein by reference.

FIELD

The present application relates to a pressure-sensitive adhesive composition, a film for protecting an optical device, an optical device, and a display device.

BACKGROUND

A protective film may be used to prevent adhesion of contaminants such as dust and scratches on optical devices such as a polarizing plate, various plastic products, electric products, or automobiles. Suitable peel-off strength and antistatic property may be required for the protective film.

For example, when the protective film is peeled at a high speed in order to use a product or assemble another product, a relatively low peel-off strength (hereinafter, referred to as a "high speed peel-off strength") is required. However, when the protective film is peeled at a low speed, the protective film may exhibit a suitable protective function with a relatively high peel-off strength (hereinafter, referred to as a "low speed peel-off strength").

In addition, due to static electricity generated in peeling of the protective film, contaminants such as dust may be sucked, destruction of static electricity of a device, if it is an electronic product, or malfunction of the device may occur. Particularly, recently, as components are integrated due to supply of a computer and multifunctionalization of a liquid crystal TV or a mobile phone, problems caused by static electricity may be being further magnified.

Accordingly, there is an attempt to provide an antistatic function to a pressure-sensitive adhesive included in the protective film.

For example, there is an attempt to inhibit generation of static electricity by adding an ethyleneoxide-modified phthalic acid dioctyl plasticizer to a pressure-sensitive adhesive in the patent document 1. In addition, in the patent document 2, an organic salt is mixed to a pressure-sensitive adhesive, and in the patent document 3, a metal salt and a chelating agent are mixed to a pressure-sensitive adhesive. However, according to the above-methods, contamination caused by transfer of a pressure-sensitive adhesive component to a product to be protected occurs, static electricity generated in an early stage is difficult to be inhibited, and a low speed peel-off strength critical to obtain a protective function is too much reduced.

PRIOR ART DOCUMENTS

Patent Documents

PATENT DOCUMENT 1: Japanese Laid-open Patent Application No. 1993-140519

PATENT DOCUMENT 2: Korean Unexamined Patent Application Publication No. 2004-0030919

PATENT DOCUMENT 1: Korean Unexamined Patent Application Publication No. 2006-0128659

DESCRIPTION

Object

The present application provides a pressure-sensitive adhesive composition, a film for protecting an optical device, an optical device, and a display device.

Solution

An illustrative pressure-sensitive adhesive composition may include a polymer, an ionic compound, and a crosslinking agent. In the pressure-sensitive adhesive composition, the polymer may be a polymer having a crosslinking point, and may react with the crosslinking agent to form a crosslinking structure.

The polymer may include, for example, a polymerization unit of a monomer including an alkyleneoxide chain and a polymerization unit of a dialkyl (meth)acrylamide as a monomer having a nitrogen atom. Here, the dialkyl (meth)acrylamide may include an alkyl group having 1 to 20, 1 to 16, 1 to 12, 1 to 8, or 1 to 4 carbon atoms. The term "monomer" used herein may refer to all types of compounds that can form a polymer through a polymerization reaction, and "the polymerization unit of a monomer" refers to a state in which a monomer is polymerized and included in a backbone of a side chain or a main chain of a polymer.

As a monomer having an alkyleneoxide chain, a compound represented by Formula 1 may be used:

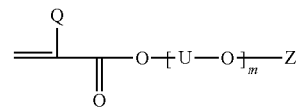

[Formula 1]

In Formula 1, Q is hydrogen or an alkyl group, U is an alkylene group, Z is hydrogen, an alkyl group, or an aryl group, m is an optional number, for example, a number of 1 to 12.

In Formula 1, when at least two of the [—U—O—] units are present, the number of carbon atoms of U in each unit may be the same as or different.

In Formula 1, m is, for example, a number in a range from 1 to 16, 1 to 12, or 1 to 10. In such a range, polymerization efficiency and crystallinity of a polymer in the preparation of the polymer may be maintained in a suitable range, and suitable conductivity may be provided to a pressure-sensitive adhesive.

The term "alkyl group" used herein may be, unless particularly defined otherwise, an alkyl group having 1 to 20, 1 to 16, 1 to 12, 1 to 8, or 1 to 4 carbon atoms. The alkyl group may be linear, branched, or cyclic. The alkyl group may be unsubstituted, or substituted by at least one substituent.

The term "alkylene or alkylidene group" used herein may be, unless particularly defined otherwise, an alkylene group or an alkylidene group having 1 to 20, 1 to 16, 1 to 12, 1 to 8, or 1 to 4 carbon atoms. The alkylene group or alkylidene group may be linear, branched, or cyclic. The alkylene group or alkylidene group may be substituted by at least one substituent when needed.

In another embodiment, in Formula 1, Q is an alkyl group, for example, an alkyl group having 1 to 8 or 1 to 4 carbon atoms. When a compound in which Q is an alkyl group is used, for example, a pressure-sensitive adhesive composition is applied to a protective film, and it can be advantageous in that the protective film is easily removed without a residue or stains on an adherend.

The "aryl group" used herein may be, unless particularly defined otherwise, a monovalent residue derived from a compound including a structure in which a benzene ring is included, at least two benzene rings are connected, or at least two benzene rings are condensed or bound to each other with sharing one or at least two carbon atoms, or a derivative thereof. The aryl group may be, for example, an aryl group having 6 to 25, 6 to 22, 6 to 16, or 6 to 13 carbon atoms. The aryl group may be a phenyl group, a phenylethyl group, a phenylpropyl group, a benzyl group, a tolyl group, a xylyl group, or a naphthyl group.

In the specification, a specific functional group, for example, a substituent that can be substituted to the alkyl group, the alkylidene group, or the alkylene group, may be, but is not limited to, an alkyl group, an alkoxy group, an alkenyl group, an epoxy group, a cyano group, a carboxyl group, an acryloyl group, a methacryloyl group, an acryloyloxy group, a methacryloyloxy group, or an aryl group.

The compound of Formula 1 may be, but is not limited to, one or at least two of alkoxy dialkyleneglycol (meth)acrylic acid ester, alkoxy trialkyleneglycol (meth)acrylic acid ester, alkoxy tetraalkyleneglycol (meth)acrylic acid ester, aryloxy dialkyleneglycol (meth)acrylic acid ester, aryloxy trialkyleneglycol (meth)acrylic acid ester, and aryloxy tetraalkyleneglycol (meth)acrylic acid ester.

Here, the alkoxy may be, for example, an alkoxy having 1 to 20, 1 to 16, 1 to 12, or 1 to 4 carbon atoms, and specifically, a methoxy group or an ethoxy group.

Here, the alkyleneglycol may be an alkyleneglycol having 1 to 20, 1 to 16, 1 to 12, or 1 to 4 carbon atoms, for example, ethyleneglycol or propyleneglycol, and the aryloxy may be an aryloxy having 6 to 24 or 6 to 12 carbon atoms, for example, phenoxy.

The polymer may further include a dialkyl (meth)acrylamide as a monomer including a nitrogen atom. As the monomer of Formula 1 is included in the polymer along with the dialkyl (meth)acrylamide, basic required physical properties including a pot life, a pressure-sensitive adhesive property, etc. may be excellently exhibited, a suitable antistatic property may be ensured, and a residue may not remain in peel-off of the pressure-sensitive adhesive. For example, when only the monomer of Formula 1 is used, an excessive amount of the monomer may be effective on an antistatic property or prevention of a residue to some degree, but may be very disadvantageous in an aspect of a pot life of the pressure-sensitive adhesive. In addition, when only the dialkyl (meth)acrylamide is used and a ratio thereof is suitably controlled, it may be effective on an antistatic property or prevention of a residue to some degree, but the pressure-sensitive adhesive has an odor, and a balance between low speed and high speed peel-off strengths is not ensured. Accordingly, a pressure-sensitive adhesive having all of the above-described physical properties may be provided by using the monomer of Formula 1 and the dialkyl (meth)acrylamide in a suitable ratio.

For example, to satisfy the physical property, the polymer may include a polymerization unit of 0.1 to 6 parts by weight of the monomer of Formula 1 and a polymerization unit of 1 to 15 parts by weight of the dialkyl (meth)acrylamide. Unless particularly defined otherwise, the unit "parts by weight" used herein may mean a weight ratio between components. For example, the expression "the polymer includes a polymerization unit of 0.1 to 6 parts by weight of the monomer of Formula 1 and a polymerization unit of 1 to 15 parts by weight of the dialkyl (meth)acrylamide" means that the polymer is formed from a monomer mixture including the weight (A) of the monomer of Formula 1 and the weight (B) of the dialkyl (meth)acrylamide in a ratio (A:B) of 0.1 to 6:1 to 15. In another embodiment, the polymer may include a polymerization unit of 0.5 to 6 or 1 to 6 parts by weight of the monomer of Formula 1, and a polymerization unit of 1 to 13 or 2 to 13 parts by weight of the dialkyl (meth)acrylamide may be included in the polymer.

In the polymer, a weight ratio (A) of the monomer of Formula 1 and a weight ratio (B) of the dialkyl (meth)acrylamide may be additionally controlled, and the weight ratio (B/A) may be controlled in a range of, for example, approximately 0.1 to 10, 0.1 to 9, 0.1 to 8, 0.1 to 7, or 0.1 to 6.

The polymer may further include a polymerization unit of a (meth)acrylic acid ester monomer, for example, an alkyl (meth)acrylate.

As the alkyl (meth)acrylate, for example, in consideration of a cohesive strength, glass transition temperature, or pressure-sensitive adhesive property of a pressure-sensitive adhesive, an alkyl (meth)acrylate having an alkyl group having 1 to 14 carbon atoms may be used. Such a monomer may be methyl (meth)acrylate, ethyl (meth)acrylate, n-propyl (meth)acrylate, isopropyl (meth)acrylate, n-butyl (meth)acrylate, t-butyl (meth)acrylate, sec-butyl (meth)acrylate, pentyl (meth)acrylate, 2-ethylhexyl (meth)acrylate, 2-ethylbutyl (meth)acrylate, n-octyl (meth)acrylate, isooctyl (meth)acrylate, isononyl (meth)acrylate, lauryl (meth)acrylate, or tetradecyl (meth)acrylate, and one or at least two thereof maybe included in the polymer as a polymerization unit.

The polymer may include a polymerization unit of 65 to 99 parts by weight of a (meth)acrylic acid ester monomer and a polymerization unit of 0.1 to 30 parts by weight of the monomer of Formula 1 and the dialkyl (meth)acrylamide. In another embodiment, the polymer may include a polymerization unit of 70 to 90 parts by weight of the (meth)acrylic acid ester monomer and 5 to 20 parts by weight of the monomer of Formula 1 and the dialkyl (meth)acrylamide. In such a range, the pressure-sensitive adhesive may exhibit a suitable pressure-sensitive property, and required physical properties such as an antistatic property and a peel-off strength may be suitably exhibited.

The polymer may further include a polymerization unit of a monomer having a hydroxyl group. The polymerization unit may provide a hydroxyl group to the polymer.

As the monomer having a hydroxyl group, for example, a monomer represented by Formula 2 may be used.

[Formula 2]

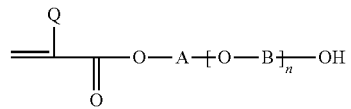

In Formula 2, Q is hydrogen or an alkyl group, A and B may be each independently an alkylene group, and n is an optional number, for example, a number of 0 to 10.

In Formula 2, when at least two [—O—B—] units are present, the number of carbon atoms of B in each unit may be the same as or different.

In Formula 2, A and B may be, for example, each independently a linear alkylene group.

The compound of Formula 2 may be, but is not limited to, 2-hydroxyethyl (meth)acrylate, 2-hydroypropyl (meth)acrylate, 4-hydroxybutyl (meth)acrylate, 6-hydroxyhexyl (meth)acrylate, 8-hydroxyoctyl (meth)acrylate, 2-hydroxyethyleneglycol (meth)acrylate, or 2-hydroxypropyleneglycol (meth)acrylate.

The polymer may include, for example, a polymerization unit of 65 to 99 parts by weight of the (meth)acrylic acid ester monomer, a polymerization unit of 0.5 to 30 parts by weight of the monomer having a hydroxyl group or 70 to 90 parts by weight of the (meth)acrylic acid ester monomer, and a polymerization unit of 0.5 to 20 parts by weight of the monomer having a hydroxyl group. In another embodiment, the polymerization unit of 1 to 15 parts by weight of the monomer having a hydroxyl group may be included. In the above-described range, the pressure-sensitive adhesive may exhibit a suitable cohesive strength and easily ensure desired performance such as antistatic performance.

In one embodiment, the monomer having a hydroxyl group may be two types of monomers having different numbers of carbon atoms present at a side chain.

For example, the polymer may include a polymerization unit of a first monomer represented by Formula 2, in which an alkylene group present in A and B has 1 to 3 carbon atoms and a second monomer represented by Formula 2, in which an alkylene group present in A and B has 4 to 20, 4 to 16, 4 to 12, 4 to 8, or 4 to 6 carbon atoms.

To distinguish the first monomer from the second monomer, only the number of carbon atoms in the alkylene group formed in a linear type is considered to calculate the number of carbon atoms, and for example, when a substituent including a carbon is substituted to A and B, the number of carbon atoms of the substituent is not considered. As such, a pressure-sensitive adhesive particularly having an excellent peel-off strength, that is, an excellent balance between high speed and low speed peel-off strengths, may be provided through a polymerization unit of two types of hydroxyl group-containing monomers.

When the polymer includes the polymerization unit of the first monomer and the polymerization unit of the second monomer, a ratio of each monomer is not particularly limited, but the polymer may include a polymerization unit of 0.1 to 30 parts by weight of the first monomer and a polymerization unit of 0.1 to 10 parts by weight of the second monomer. In another embodiment, the polymer may include a polymerization unit of approximately 1 to 25, 1 to 20, or 1 to 15 parts by weight of the first monomer and a polymerization unit of approximately 0.1 to 8, 0.1 to 5, or 1 to 3 parts by weight of the second monomer. In such a range, the first monomer may be included in the polymer at a larger amount than the second monomer, and for example, a ratio (AB) of a weight (A) of the first monomer to a weight (B) of the second monomer may range from approximately 1 to 25. Another lower limit of the ratio (A/B) may be, for example, approximately 1.1 to 1.2, and another upper limit of the ratio (A/B) may be approximately, for example, 20, 15, 10, or 8. Within such a range, a pressure-sensitive adhesive that exhibits a suitable antistatic performance, does not leave a contaminant in peel-off, and exhibits a suitable balance between high speed and low speed peel-off strengths may be provided.

The polymer may further include a known monomer used in preparation of a polymer of the pressure-sensitive adhesive, for example, a carboxyl group-containing monomer such as (meth)acrylic acid, 2-(meth)acryloyloxy acetic acid, 3-(meth)acryloyloxy propylic acid, 4-(meth)acryloyloxy butyric acid, acrylic acid dimer, itaconic acid, maleic acid, or maleic anhydride; a monomer having an isocyanate group; a monomer having a glycidyl group such as glycidyl (meth)acrylate; a radical polymerizable monomer including a nitrogen atom such as (meth)acrylamide, N-vinyl pyrrolidone, or N-vinyl caprolactam; or a radical polymerizable monomer such as styrene when needed. Such monomers are polymerized and included in the polymer, and may be included in the polymer, for example, at approximately 20 parts by weight or less.

The polymer may be prepared by selecting a necessary monomer from the above-described monomers, and applying a mixture of the selected monomers in a desired ratio to a polymerization method such as solution polymerization, photo polymerization, bulk polymerization, suspension polymerization, or emulsion polymerization.

The pressure-sensitive adhesive composition may include a photostabilizer such as a hindered amine compound. Since such a photostabilizer is not cohered even when a pressure-sensitive adhesive is maintained at a high temperature, it does not cause a phenomenon of increasing a concentration of an antistatic agent which will be described below in a cohesive cluster, prevents generation of radicals by breaking an ether bond part of an alkyleneoxide chain included in the polymer by heat or condensation of the hydroxyl group-containing monomer, and can greatly improve storage stability of the pressure-sensitive adhesive composition.

The photostabilizer may be, for example, a compound represented by Formula 3.

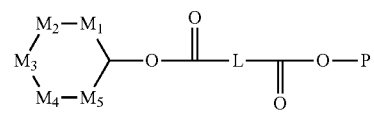

[Formula 3]

In Formula 3, $M_1$ to $M_5$ are each independently $R^1$—N, $(R^2)(R^3)$—C, or $(R^4)(R^5)$—C, in which $R^1$ is a hydrogen atom, an alkyl group, or an alkoxy group, $R^2$ and $R^3$ are each independently an alkyl group, $R^4$ and $R^5$ are each independently a hydrogen atom or an alkyl group, L is an alkylene group or an alkylidene group, and P is an alkyl group or a substituent of Formula 4. In Formula 3, at least one of $M_2$ to $M_4$ is $R^1$—N, and $M_1$, $M_2$, $M_3$, $M_4$, or $M_5$ just adjacent to $M_2$, $M_3$, or $M_4$ that is $R^1$—N may be $(R^2)(R^3)$—C.

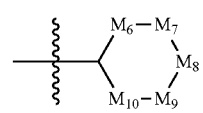

[Formula 4]

In Formula 4, $M_6$ to $M_{10}$ are each independently $R^1$—N, $(R^2)(R^3)$—C, or $(R^4)(R^5)$—C, in which $R^1$ is a hydrogen atom, an alkyl group, or an alkoxy group, $R^2$ and $R^3$ are each independently an alkyl group, and $R^4$ and $R^5$ are each independently a hydrogen atom or an alkyl group. In Formula 4, at least one of $M_7$ to $M_9$ is $R^1$—N, and $M_6$, $M_7$, $M_8$, $M_9$, or $M_{10}$ just adjacent to $M_7$, $M_8$, or $M_9$ that is $R^1$—N may be $(R^2)(R^3)$—C.

In Formulas 3 and 4, the expression "$M_1$ to $M_{10}$ are $R^1$—N, $(R^2)(R^3)$—C, or $(R^4)(R^5)$—C" may mean that a nitrogen (N) atom or a carbon (C) atom is present at the position of $M_1$ to $M_{10}$, and a substituent selected from $R^1$ to $R^5$ binds to the nitrogen atom or the carbon atom.

In Formula 4, the mark

means that the carbon atom of Formula 4 linked to the mark binds to the oxygen atom of Formula 3.

In Formula 3, the alkylene group or alkylidene group, that is, L, may be substituted or non-substituted when needed. For example, L may be substituted by an aryl group, which may be, but is not limited to, a 3,5-bis(1,1-dimethylethyl)-4-hydroxyphenyl group.

In Formula 3, $R^1$ may be, for example, a hydrogen atom, an alkyl group having 1 to 8 or 1 to 4 carbon atoms, or an alkoxy group having 4 to 16, or 4 to 12 carbon atoms. The alkyl group or the alkoxy group may be linear or branched, and may be substituted by at least one substituent.

In Formula 3, $R^2$, $R^3$, and P may be each independently an alkyl group having 1 to 12, 1 to 8, or 1 to 4 carbon atoms. The alkyl group may be linear or branched, and may be substituted by at least one substituent.

In addition, in Formula 3, $R^4$ and $R^5$ may be hydrogen atoms.

In addition, in Formula 3, L may be, for example, an alkylene group having 4 to 12 or 6 to 10 carbon atoms, or an alkylidene group having 2 to 10 or 4 to 8 carbon atoms. The alkylene group or alkylidene group may be linear or branched, and may be substituted by at least one substituent.

The compound of Formula 3 may be, but is not limited to, for example, bis(1,2,2,6,6-pentamethyl-4-piperidyl)sebacate, methyl 1,2,2,6,6-pentamethyl-4-piperidyl sebacate, propanedioic acid,2-[[3,5-bis(1,1-dimethylethyl)-4-hydroxyphenyl]methyl]-2-butyl-1,3-bis(1,2,2,6,6-pentamethyl-4-piperidinyl) ester, bis(2,2,6,6-tetramethyl-4-piperidyl)sebacate, or bis-(1-octyloxy-2,2,6,6-tetramethyl-4-piperidinyl)sebacate.

The photostabilizer may be included in the pressure-sensitive adhesive composition at 0.01 to 10, 0.05 to 10, 0.05 to 8, 0.05 to 6, or 0.05 to 5 parts by weight relative to 100 parts by weight of the polymer. In such a range, a pressure-sensitive adhesive composition which effectively prevents generation of radicals by breakage of the alkyleneoxide chain or condensation of a hydroxyl group-containing monomer, and has excellent storage stability may be provided.

The pressure-sensitive adhesive composition may further include a crosslinking agent, which reacts with a crosslinking point of the polymer to implement a crosslinking structure.

For example, as the crosslinking agent, an aliphatic isocyanate crosslinking agent may be used. When such a crosslinking agent forms a crosslinking structure with the polymer, that is, a polymer including at least two hydroxyl group-containing monomers, a pressure-sensitive adhesive having suitable low speed and high speed peel-off strengths and a necessary antistatic property may be implemented.

For example, as the crosslinking agent, a crosslinking agent including an aliphatic cyclic isocyanate compound and/or an aliphatic non-cyclic isocyanate compound may be used. Here, the term "aliphatic cyclic isocyanate compound" may refer to an isocyanate compound including a ring structure, which does not correspond to an aromatic ring, and the "aliphatic non-cyclic isocyanate compound" may refer to, for example, an aliphatic linear or branched isocyanate compound. Here, the aliphatic cyclic isocyanate compound may be, for example, an isocyanate compound such as isophorone diisocyanate, methylene dicyclohexyl diisocyanate, or cyclohexane diisocyanate, a derivative such as a dimer or trimer thereof, or a reaction product of any one of the above compounds with a polyol (e.g., trimethylolpropane), and the "aliphatic non-cyclic isocyanate compound" may be an alkylene diisocyanate compound having 1 to 20, 1 to 16, 1 to 12, or 1 to 8 carbon atoms such as hexamethylene diisocyanate, a derivative such as a dimer or trimer thereof, or a reaction product of any one of the above compounds with a polyol (e.g., trimethylolpropane), but the present application is not limited thereto.

Here, when the aliphatic cyclic isocyanate compound and the aliphatic non-cyclic isocyanate compound are used together, the ratios are not particularly limited, and may be appropriately selected according to necessity. Conventionally, the crosslinking agent may include approximately 1 to 500 or 20 to 300 parts by weight of the aliphatic non-cyclic isocyanate compound relative to 100 parts by weight of the aliphatic cyclic isocyanate compound. As the crosslinking agent, that is, as the crosslinking agent including an aliphatic cyclic isocyanate compound and an aliphatic non-cyclic isocyanate compound, commercially available one, for example, MHG-80B and Duranate P produced by Asahi or NZ-1 produced by BAYER may be used.

When additionally needed, a known crosslinking agent such as an epoxy crosslinking agent such as ethyleneglycol diglycidylether, triglycidylether, trimethylolpropane triglycidylether, N,N,N',N'-tetraglycidyl ethylenediamine, or glycerin diglycidylether; an aziridine crosslinking agent such as N,N'-toluene-2,4-bis(1-aziridine carboxamide), N,N'-diphenylmethane-4,4'-bis(1-aziridine carboxamide), triethylenemelamine, bis isoprothaloyl-1-(2-methylaziridine), or tri-1-aziridinyl phosphineoxide; or a metal chelate crosslinking agent such as a compound prepared by coordinating a multifunctional metal such as aluminum, iron, zinc, tin, titanium, antimony, magnesium, and/or vanadium to acetyl acetone or ethyl acetoacetate may also be used.

The pressure-sensitive adhesive composition may include a crosslinking agent at 0.01 to 10 or 0.01 to 5 parts by weight relative to 100 parts by weight of the polymer. In such a range, a suitable crosslinking structure may be implemented, and the low speed and high speed peel-off strengths of the pressure-sensitive adhesive may be controlled in a desired range.

The pressure-sensitive adhesive composition may further include an antistatic agent. As the antistatic agent, for example, an ionic compound may be used, and as an anion, an ionic compound including bis(fluorosulfonyl)imide may be used. The bis(fluorosulfonyl)imide may have an electrically stable form to stably provide antistatic performance to the pressure-sensitive adhesive.

As the ionic compound, various compounds including the anion, for example, an inorganic salt or an organic salt may be used. As the inorganic salt, for example, a compound including a metal cation such as an alkali metal cation or an alkali earth metal cation, along with the anion may be used. The cation may be one or at least two of a lithium ion ($Li^+$), a sodium ion ($Na^+$), a potassium ion ($K^+$), a rubidium ion ($Rb^+$), a cesium ion ($Cs^+$), a beryllium ion ($Be^{2+}$), a magnesium ion ($Mg^{2+}$), a calcium ion ($Ca^{2+}$), a strontium ion ($Sr^{2+}$), and a barium ion ($Ba^{2+}$), preferably, one or at least two of a lithium ion, a sodium ion, a potassium ion, a magnesium ion, a calcium ion, and a barium ion, and more preferably, a lithium ion in consideration of ion stability and mobility.

When the ionic compound is an organic salt, an organic salt including a cation, for example, a quaternary ammonium compound such as N-ethyl-N,N-dimethyl-N-propylammonium, N,N,N-trimethyl-N-propylammonium, N-methyl-N,N,N-tributylammonium, N-ethyl-N,N,N-tributylammonium, N-methyl-N,N,N-trihexylammonium, N-ethyl-N,N,N-trihexylammonium, N-methyl-N,N,N-trioctylammonium, or N-ethyl-N,N,N-trioctylammonium, phosphonium such as tetraalkyl phosphonium or a derivative thereof, pyridinium or a derivative thereof, tetrahydropyridinium or a derivative thereof, dihydropyridinium or a derivative thereof, imidazolium or a derivative thereof, a compound including a pyrroline backbone or a derivative thereof, a compound including a pyrrole backbone or a derivative thereof, imidazolinium such as 1-ethyl-3-methyl-imidazolium or a derivative thereof, pyrazolium or a derivative thereof, trialkyl sulfonium or a derivative thereof, pyrrolidinium such as 1-methyl-1-propyl pyrrolidinium or a derivative thereof, or piperidinium such as 1-methyl-1-propyl piperidinium or a derivative thereof, and the anion component may be used. As the organic salt, a compound including a cation in which an alkyl group is substituted by an alkynyl group or an epoxy group among the above-described cations may be used.

In the pressure-sensitive adhesive composition, the ionic compound may be included at, for example, 0.01 to 5, 0.1 to 5, 0.1 to 4, 0.1 to 3, 0.1 to 2, or 0.1 to 1 part by weight relative to 100 parts by weight of the polymer, but the present application is not particularly limited thereto. A ratio of the ionic compound may be changed in consideration of a desired antistatic property or compatibility between components.

The pressure-sensitive adhesive composition may further include a silane coupling agent. The coupling agent may be one or a mixture of at least two of γ-glycidoxypropyl triethoxy silane, γ-glycidoxypropyl trimethoxy silane, γ-glycidoxypropyl methyldiethoxy silane, γ-glycidoxypropyl triethoxy silane, 3-mercaptopropyl trimethoxy silane, vinyltrimethoxy silane, vinyltriethoxy silane, γ-methacryloxypropyl trimethoxy silane, γ-methacryloxypropyl triethoxy silane, γ-aminopropyl trimethoxy silane, γ-aminopropyl triethoxy silane, 3-isocyanatopropyl triethoxy silane, γ-acetoacetatepropyl trimethoxy silane, γ-acetoacetatepropyl triethoxy silane, β-cyanoacetyl trimethoxy silane, β-cyanoacetyl triethoxy silane, and acetoxyaceto trimethoxy silane. For example, as the silane coupling agent, a silane coupling agent having an acetoacetate group or a beta-cyanoacetyl group may be preferably used. The pressure-sensitive adhesive composition may include the silane coupling agent at 0.01 to 5 or 0.01 to 1 part by weight relative to 100 parts by weight of the polymer. In the above range, a suitable pressure-sensitive adhesive strength may be increased and durability and reliability may be ensured.

The pressure-sensitive adhesive composition may further include a tackifier to control pressure-sensitive adhesive performance. The tackifier may be a hydrocarbon-based resin or a hydrogenated product thereof, a rosin resin or a hydrogenated product thereof, a rosin ester resin or a hydrogenated product thereof, a terpene resin or a hydrogenated product thereof, a terpene phenol resin or a hydrogenated product thereof, a polymerized rosin resin, or a polymerized rosin ester resin, which may be used alone or in combination of at least two thereof. The tackifier may be included in the composition at 1 to 100 parts by weight relative to 100 parts by weight of the polymer. In the content range, a suitable addition effect and enhancement in compatibility and a cohesive strength may be ensured.

The pressure-sensitive adhesive composition may further include at least one additive selected from the group consisting of a coordination compound capable of forming a coordinate bond with the antistatic agent, a photoinitiator, a multifunctional acrylate, an epoxy resin, a crosslinking agent, a UV stabilizer, an antioxidant, a coloring agent, a reinforcing agent, a filler, a foaming agent, a surfactant, and a plasticizer as long as it does not affect the desired effect.

The pressure-sensitive adhesive composition may have a low speed peel-off strength to an adherend having surface energy of 30 mN/m or less in a state in which a crosslinking structure is implemented of approximately 1 to 40, 1 to 30, 1 to 20, or 1 to 10 gf/25 mm, and a high speed peel-off strength of approximately 10 to 150 or 10 to 100 gf/25 mm.

Here, the term "low speed peel-off strength" may be, for example, a peel-off strength measured at a peel-off angle of 180 degrees and a peel-off speed of 0.3 m/min, and the "high speed peel-off strength" may be a peel-off strength measured at a peel-off angle of 180 degrees and a peel-off speed of 30 m/min.

Specifically, each of the peel-off strengths may be measured at the above-described peel-off angle and peel-off speed after the pressure-sensitive adhesive composition in which a crosslinking structure is implemented is adhered to an adherend having surface energy of 30 mN/m or less, maintained at a temperature of 23° C. and a relative humidity of 65% for 24 hours. A specific method of measuring the peel-off strength will be described in the following Example.

A method of measuring surface energy of the adherend may be a known method of measuring surface energy, but the present application is not particularly limited thereto. For example, the surface energy may be calculated by measuring a contact angle of the adherend, or may be measured using known surface energy measuring equipment. The surface energy of the adherend may be approximately, for example, 10 to 30 mN/m.

The pressure-sensitive adhesive composition may also have a ratio (H/L) of the high speed peel-off strength (H) to the low speed peel-off strength (L) of 1 to 15, 5 to 15, or 7 to 13.

The pressure-sensitive adhesive composition may have a peel-off electrostatic discharge (ESD) generated when peeled from the adherend, that is, the adherend having surface energy of 30 mN/m or less at a peel-off angle of 180 degrees and a peel-off speed of 40 m/min in a state in which a crosslinking structure is implemented of 0.5 kV or less. The method of measuring a peel-off ESD will be described in the following Example.

When such low speed and high speed peel-off strengths and/or peel-off ESD are ensured, the pressure-sensitive adhesive composition may exhibit a suitable protective function to an adherend, may minimize occurrence of static electricity, and may be easily peeled at a high speed.

In another aspect, the present application provides a pressure-sensitive adhesive sheet. The pressure-sensitive adhesive sheet may be, for example, a protective film, and particularly, a protective film for an optical device.

For example, the pressure-sensitive adhesive sheet may be used as a protective film for an optical device such as a polarizing plate, a polarizer, a polarizer protective film, a viewing angle compensation film, or a brightness enhancing film. The terms "polarizer" and "polarizing plate" used herein are objects different from each other. That is, the polarizer refers to a film, sheet, or device exhibiting a polarizing function, and the polarizing plate refers to an optical device including another component in addition to the polarizer. As another factor that can be included in the optical device in addition to the polarizer, a polarizer protective film or a retardation film may be used, but the present application is not limited thereto.

The pressure-sensitive adhesive sheet may include, for example, a base film for protecting a surface and a pressure-sensitive adhesive layer present on one surface of the base film. The pressure-sensitive adhesive layer may include, for example, a crosslinked pressure-sensitive adhesive composition, that is, a pressure-sensitive adhesive composition in which a crosslinking structure is implemented, as the pressure-sensitive adhesive composition.

The pressure-sensitive adhesive composition exhibits a relatively high low speed peel-off strength and a relatively low high speed peel-off strength after a crosslinking structure is implemented, excellent balance between the peel-off strengths, and excellent durability and reliability, workability, transparency, and an antistatic property. Accordingly, the protective film may be effectively used as a surface protective film to protect various types of optical devices or parts, or display devices or parts, for example, a surface of an optical device such as a polarizing plate, a retardation plate, an optical compensation film, a reflective sheet, and a brightness enhancing film used in an LCD, and the above uses are not limited to the protective film.

As the base film for protecting a surface, a general film or sheet known in the art may be used. For example, the base film for protecting a surface may be a plastic film such as a polyester film formed of polyethyleneterephthalate, or polybutyleneterephthalate, a polytetrafluoroethylene film, a polyethylene film, a polypropylene film, a polybutene film, a polybutadiene film, a poly(vinyl chloride) film, or a polyimide film. Such a film may be composed of a single layer, or a stacked structure of at least two layers, and in some cases, further include a functional layer such as an antistaining layer or an antistatic layer. In addition, to enhance base cohesion, surface treatment such as primer treatment may be performed on one or both surfaces of the base.

A thickness of the base film is suitably selected according to a use, and may be conventionally, but is not particularly limited to, 5 to 500 µm or 10 to 100 µm.

A thickness of the pressure-sensitive adhesive layer included in the pressure-sensitive adhesive sheet may be approximately, but is not particularly limited to, for example, 2 to 100 µm or 5 to 50 µm.

A method of forming the pressure-sensitive adhesive layer may be, but is not particularly limited to, for example, coating a pressure-sensitive adhesive composition or a coating solution prepared thereof on a base film using a conventional means such as a bar coater and curing the coated pressure-sensitive adhesive composition, or coating the a pressure-sensitive adhesive composition or a coating solution on a surface of a peelable base and curing the coated pressure-sensitive adhesive composition or coating solution and then transferring the coated pressure-sensitive adhesive composition or coating solution to the base film.

A process of forming the pressure-sensitive adhesive layer may be performed after a volatile component, or a bubbling component such as a reaction residue in the pressure-sensitive adhesive composition or coating solution is sufficiently removed. Accordingly, problems of reducing an elastic modulus due to an excessively low crosslinking density or a molecular weight of the pressure-sensitive adhesive, and forming a scatterer in the pressure-sensitive adhesive layer due to increasing bubbles present between a glass plate and the pressure-sensitive adhesive layer at a high temperature may be prevented.

In the above process, a method of curing the pressure-sensitive adhesive composition is not particularly limited, either, and may be performed through a suitable aging process that can react a polymer with a crosslinking agent included in the composition, or light radiation, for example, UV radiation, that can induce activation of a photoinitiator therein.

The pressure-sensitive adhesive layer may have, for example, a gel content of approximately 80 to 99%. The gel content may be calculated by, for example, Expression 1:

$$\text{Gel content} = B/A \times 100 \qquad \text{[Expression 1]}$$

In Expression 1, A is a mass of the pressure-sensitive adhesive, and B is a dry mass of an insoluble content recovered after the pressure-sensitive adhesive is dipped in ethyl acetate at room temperature for 48 hours.

In still another aspect, the present application provides an optical device. The illustrative optical device may include an optical element, and the pressure-sensitive adhesive sheet adhered to a surface of the optical element. For example, a pressure-sensitive adhesive layer of the pressure-sensitive adhesive sheet is adhered to a surface of the optical element, and therefore the optical element may be protected by the base film for protecting a surface.

The optical element included in the optical device may be, for example, a polarizer, a polarizing plate, a polarizer protective film, a retardation layer, or a viewing angle compensation layer.

Here, as the polarizer, for example, a general type known in the art such as a polyvinyl alcohol polarizer may be employed without limitation.

The polarizer is a functional film or sheet that can extract only light oscillating in one direction from incident light oscillating in various directions. Such a polarizer may be, for example, a form in which a dichroic dye is adsorbed and oriented on a polyvinyl alcohol-based resin film. The polyvinyl alcohol-based resin constituting a polarizer may be obtained by, for example, gelating a polyvinylacetate-based resin. In this case, in the polyvinylacetate-based resin that can be used, in addition to a homopolymer of vinyl acetate, a polymer of vinyl acetate and a different monomer copolymerizable therewith may be included. Here, an example of a monomer that can be copolymerized with vinyl acetate may be, but is not limited to, one or a mixture of at least two of unsaturated carbonic acids, olefins, vinyl ethers, unsaturated sulfonic acids, and acryl amides having an ammonium group. A degree of gelation of the polyvinyl alcohol-based resin may be approximately 85 to 100 mol %, and preferably 98 mol % or more. The polyvinyl alcohol-based resin may be further modified, and for example, polyvinyl formal or polyvinyl acetal modified by aldehydes may also be used. In addition, a degree of polymerization of the polyvinyl alcohol-based resin may be approximately 1,000 to 10,000, and preferably 1,500 to 5,000.

A disc-shaped film of the polarizer may be formed using the polyvinyl alcohol-based resin. A method of forming a film using a polyvinyl alcohol-based resin may be, but is not particularly limited to, a general method known in the art. A thickness of the disc-shaped film formed of the polyvinyl alcohol-based resin may be, but is not particularly limited to, for example, suitably controlled within a range of 1 to 150 µm. In consideration of stretching feasibility, the thickness of the disc-shaped film may be controlled to 10 μm or more. The polarizer may be manufactured by a process of elongating (e.g., uniaxial elongation) the polyvinyl alcohol-based resin film, a process of dying the polyvinyl alcohol-based resin film with a dichroic dye and adsorbing the dichroic dye, a process of treating the polyvinyl alcohol-based resin film to which the dichroic dye is adsorbed with a boric acid aqueous solution, and a process of washing the polyvinyl alcohol-based resin film after treated with the boric acid aqueous solution. Here, as the dichroic dye, iodine or a dichroic organic dye may be used.

The polarizing plate may include, for example, the polarizer; and another optical film adhered to one or both surfaces of the polarizer. Here, as another optical film, the above-described polarizer protective film, a retardation layer, a viewing angle compensation layer, or an antiglare layer may be used.

Here, the polarizer protective film may be a protective film to the polarizer to be distinguished from the protective film including the pressure-sensitive adhesive layer. As the polarizer protective film, for example, a multilayer film stacked with a protective films composed of a cellulose-based film such as triacetyl cellulose; an acryl film; a polyester-based film such as a polycarbonate film or poly-ethyleneterephthalate film; a polyethersulfone-based film; and/or a polyolefin-based film such as a polyethylene film, a polypropylene film, a polyolefin film having a cyclic or norbornene structure, or an ethylene propylene polymer may be used. A thickness of the protective film is not particularly limited, either, and therefore the protective film may be formed to a conventional thickness.

A surface treatment layer may be present on a surface of the optical element protected by the protective film in the optical device. The surface treatment layer may have surface energy of, for example, 30 mN/m or less. That is, in the optical device, the surface treatment layer having surface energy of 30 mN/m or less may be formed on a surface of the optical element protected by the protective film, and the pressure-sensitive adhesive layer of the protective film may be adhered to the surface treatment layer.

The surface treatment layer may be a high hardness layer, an a glariness preventing layer such as an antiglare (AG) layer or a semi-glare (SG) layer, or a low reflection layer such as an anti-reflection (AR) layer or a low-reflection (LR) layer.

The high hardness layer may be a layer having a pencil hardness under a load of 500 g of 1H or more or 2H or more. The pencil hardness may be measured, for example, using a pencil lead regulated in KS G2603 according to ASTM D 3363.

The high hardness layer may be, for example, a high-hardness resin layer. The resin layer may include, for example, a room temperature-curable, moisture-curable, heat-curable, or active energy ray-curable resin composition in a cured state. In one embodiment, the resin layer may include a heat-curable or active energy ray-curable resin composition, or an active energy ray-curable resin composition in a cured state. In the description of the high hardness layer, the "cured state" may mean a state in which components included in each resin composition are subjected to crosslinking or polymerization, and therefore the resin composition is converted into a hard state. In addition, here, the room temperature-curable, moisture-curable, heat-curable, or active energy ray-curable resin composition may be a composition which is cured at room temperature, or cured by application of heat or irradiation of active energy rays under suitable humidity.

Various resin compositions that can satisfy a pencil hardness in the above-described range in a cured state are known in the art, and one of ordinary skill in the art may easily select a suitable resin composition.

In one embodiment, the resin composition may include an acryl compound, an epoxy compound, a urethane compound, a phenol compound, or a polyester compound as a main component. The "compound" may be a monomeric, oligomeric, or polymeric compound.

In one embodiment, the resin composition may be an acryl resin composition having an excellent optical characteristic such as transparency and excellent resistance to yellowing, for example, an active energy ray-curable acryl resin composition.

The active energy ray-curable acryl composition may include, for example, an active energy ray-polymerizable polymer component and a monomer for reactive dilution.

The polymer component may be a component known in the art as an active energy ray-polymerizable oligomer such as urethane acrylate, epoxy acrylate, ether acrylate, or ester acrylate, or a polymer of a mixture including a monomer such as a (meth)acrylic acid ester monomer. Here, the (meth)acrylic acid ester monomer may be an alkyl (meth)acrylate, a (meth)acrylate having an aromatic group, a heterocyclic (meth)acrylate, or alkoxy (meth)acrylate. Various polymer components to prepare an active energy ray-curable composition are known in the art, and the above-described compound may be selected according to necessity.

As the monomer for reactive dilution that can be included in the active energy ray-curable acryl composition may be a monomer having one or at least two of an active energy ray-curable functional group, for example, an acryloyl group or a methacryloyl group. As the monomer for reactive dilution, for example, the (meth)acrylic acid ester monomer or a multifunctional acrylate may be used.

Selection of the component to prepare the active energy ray-curable acryl composition or a mixing ratio of the selected component is not particularly limited, and may be controlled in consideration of a hardness and other physical properties of a desired resin layer.

As the glariness preventing layer such as an AG layer or an SG layer, for example, a resin layer having an uneven surface, or a resin layer including particles that have a different refractive index from that of the resin layer may be used.

Here, as the resin layer, for example, a resin layer used to form the high hardness layer may be used. When the glariness preventing layer is formed, it is not necessary to control components of a resin composition for the resin layer to have a high hardness, but a resin layer may be formed to exhibit a high hardness.

Here, a method of forming an uneven surface on the resin layer is not particularly limited. For example, the resin composition may be cured while a coating layer of the resin composition is in contact with a mold having a desired uneven structure, or an uneven structure may be implemented by mixing particles having suitable particle sizes with a resin composition, and coating and curing the mixture.

Also, the glariness preventing layer may be implemented using particles having a different refractive index from that of the resin layer.

In one embodiment, the particles may have a difference in refractive index with the resin layer of 0.03 or less or 0.02 to 0.2. When the difference in refractive index is excessively small, it is difficult to induce a haze, and when the difference in refractive index is excessively large, scattering occurs a lot in the resin layer, and therefore a haze is increased, but a decrease in light transmissivity or a contrast characteristic may be induced. In consideration of these aspects, suitable particles may be selected.

A shape of the particle included in the resin layer may be, but is not particularly limited to, for example, spherical, oval, polygonal, amorphous, or other shapes. The particle has an average diameter of 50 to 5,000 nm. In one embodiment, as the particles, particles having an uneven surface may be used. Such particles may have, for example, an average surface roughness (Rz) of 10 to 50 nm or 20 to 40 nm, and/or the maximum height of a bump on the uneven surface of approximately 100 to 500 nm or 200 to 400 nm, and a width between bumps of approximately 400 to 1,200 nm or 600 to 1,000 nm. Such particles have excellent compatibility with the resin layer or dispersibility in the resin layer.

As the particles, various inorganic or organic particles may be used. The inorganic particles may be silica, amorphous titania, amorphous zirconia, indium oxide, alumina, amorphous zinc oxide, amorphous cerium oxide, barium oxide, calcium carbonate, amorphous barium titanate, or barium sulfate, and the organic particles may be particles including a crosslinking product or non-crosslinking product of an organic material such as an acryl resin, a styrene resin, an urethane resin, a melamine resin, a benzoguanamine resin, an epoxy resin, or a silicon resin, but the present application is not limited thereto.

The uneven structure formed on the resin layer or the content of the particles is not particularly limited. The shape of the uneven structure or the content of the particles may be controlled to have a haze of the resin layer of approximately 5 to 15%, 7 to 13%, or 10% for the AG layer, or approximately 1 to 3% for the SG layer. The haze may be measured using a hazemeter such as HR-100 or HM-150 commercially available from Sepung according to a manufacturer's manual.

The low reflection layer such as the AR or LR layer may be formed by coating a low refractive material. Various low refractive materials capable of forming the low reflection layer are known, and may be suitably selected and used for the optical device. The low reflection layer may be formed to have a reflectance of approximately 1% or less by coating a low refractive material.

To form a surface treatment layer, a material disclosed in Korean Unexamined Patent Application No. 2007-0101001, 2011-0095464, 2011-0095004, 2011-0095820, 2000-0019116, 2000-0009647, 2000-0018983, 2003-0068335, 2002-0066505, 2002-0008267, 2001-0111362, 2004-0083916, 2004-0085484, 2008-0005722, 2008-0063107, 2008-0101801, or 2009-0049557 may also be used.

One or a combination of at least two of the surface treatment layers may be formed. The combination may be formed by forming a high hardness layer on a surface of a base layer, and forming a low reflection layer thereon.

In yet another aspect, the present application provides a display device, for example, a liquid crystal display (LCD). The illustrative display device may include a liquid crystal panel, and the optical device may be adhered to one or both surfaces of the liquid crystal panel. The film may be adhered to the liquid crystal panel using, for example, an adhesive or a pressure-sensitive adhesive. Here, the adhesive or pressure-sensitive adhesive is one other than the pressure-sensitive adhesive present in the above-described protective film.

A type of the liquid crystal panel included in the LCD is not particularly limited. For example, the type of the liquid crystal panel is not limited, and all types of known liquid crystal panels including all types of passive matrix panels including a twisted nematic (TN)-mode, super twisted nematic (STN)-mode, ferroelectric (F)-mode, and polymer dispersed LCD (PD LCD)-mode panel; all types of active matrix panels including a two terminal-mode and three terminal-mode panel; an in-plane switching (IPS)-mode panel; and a vertically aligned (VA)-mode panel may be applied. In addition, types of other components included in the LCD and a method of manufacturing the same are not particularly limited, either, and therefore general components known in the art may be employed without limitation.

Effect

A pressure-sensitive adhesive composition of the present application can exhibit excellent storage stability, suitable low speed and high speed peel-off strengths after a crosslinking structure is formed, and an excellent balance between them. Accordingly, the pressure-sensitive adhesive composition can exhibit an excellent protective effect when applied to a protective film, can be easily peeled in a high speed peel-off and thus advantageous for a high speed process, and can exhibit an excellent antistatic property.

ILLUSTRATIVE EMBODIMENTS

Hereinafter, a pressure-sensitive adhesive composition will be described in detail with reference to examples and comparative examples, but the scope of the pressure-sensitive adhesive composition is not limited to the following examples.

1. Measurement of Pot Life

A viscosity of a coating solution (pressure-sensitive adhesive composition) of each Example or Comparative Example prepared by mixing a crosslinking agent with a polymer which was previously prepared was measured at 0 hr and 24 hr after the preparation, and then a pot life was evaluated according to the following criteria. Here, the viscosity was measured in an RPM section in which a torque of a confidence interval was maintained using a Brookfield viscometer (DV-II+) by putting the coating solution into a 250 mL glass bottle to have a weight of approximately 200 g, and keeping the bottle in a constant temperature bath maintaining a temperature at 23° C. for 30 minutes to meet a temperature equilibrium.

<Criteria for Evaluating Pot Life>

O: After 24 hr of preparation (from 0 hr), change in viscosity was less than 30%

X: After 24 hr of preparation (from 0 hr), change in viscosity was 30% or more

2. Measurement of Low Speed Peel-Off Strength

A pressure-sensitive adhesive sheet prepared in Example or Comparative Example was adhered to a glariness preventing layer formed on a polarizing plate using a 2 Kg roller according to JIS Z 0237. Afterward, the resulting product was maintained at 23° C. and a relative humidity of 65% for 24 hours, and cut to have a size of 25 mm×120 mm (width×length), thereby preparing a sample. Afterward, the sample was fixed on a glass substrate, and then the pressure-sensitive adhesive sheet was peeled from the glariness preventing layer in a horizontal direction at a peel-off angle of 180 degrees and a peel-off speed of 0.3 m/min using a tensile tester to measure a peel-off strength. The peel-off strength was measured for two same samples, and an average was adopted.

3. Measurement of High Speed Peel-Off Strength

A pressure-sensitive adhesive sheet prepared in Example or Comparative Example was adhered to a glariness preventing layer formed on a polarizing plate using a 2 Kg roller according to JIS Z 0237. Afterward, the resulting product was maintained at 23° C. and a relative humidity of 65% for 24 hours, and cut to have a size of 25 mm×250 mm (width×length), thereby preparing a sample. Afterward, the sample was fixed on a glass substrate, and then the pressure-sensitive adhesive sheet was peeled from the glariness preventing layer in a horizontal direction at a peel-off angle of 180 degrees and a peel-off speed of 30 m/min using a tensile tester to measure a peel-off strength. The peel-off strength was measured for two same samples, and an average was adopted.

4. Measurement of Peel-Off Electrostatic Discharge (ESD)

A sample was prepared by the same method as described in the measurements of low speed and high speed peel-off strengths, except that the sample had a size of approximately 22 cm×25 cm (width×length). Subsequently, the sample was fixed on a glass substrate, a pressure-sensitive adhesive sheet of the sample was peeled using a tensile tester at a peel-off angle of approximately 180 degrees and a peel-off speed of 40 m/min to measure peel-off ESD.

5. Staining After Removal of Pressure-Sensitive Adhesive Sheet

The pressure-sensitive adhesive sheet was peeled from the same sample as used in the measurement of the low speed peel-off strength, and staining on a surface of an adherend due to static electricity was observed and evaluated according to the following criteria.

<Evaluation Criteria>

A: when staining was not observed on a surface of the adherend

B: when staining was observed on a surface of the adherend

Preparation Example 1. Preparation of Acrylic Polymer (A)

85 parts by weight of 2-ethylhexyl acrylate (2-EHA), 2 parts by weight of 4-hydroxybutyl acrylate (4-HBA), 5 parts by weight of 2-hydroxyethyl acrylate (2-HEA), 3 parts by weight of dimethyl acrylamide, and 5 parts by weight of polyethyleneglycol monomethylether methacrylate (ethyleneoxide unit added mole number: 9 mol) were added to an 1 L reactor equipped with a cooling device to perform a reflux of a nitrogen gas and facilitate temperature control, and then 100 parts by weight of ethyl acetate was added as a solvent. Subsequently, a nitrogen gas was purged for 1 hour to remove oxygen, a reaction initiator (AIBN: azobisisobutyronitrile) was added for a reaction for approximately 8 hours, and the reaction product was diluted with ethyl acetate. Therefore, an acrylic polymer A was prepared.

Preparation Examples 2 to 9. Preparation of Acrylic Polymers B to I

An acrylic polymer was prepared by the same method as described in Example 1, except that a ratio of monomers used to prepare the polymer was changed as shown in Table 1.

TABLE 1

| | Preparation Example | | | | | | | | |
|---|---|---|---|---|---|---|---|---|---|
| | 1 | 2 | 3 | 4 | 5 | 6 | 7 | 8 | 9 |
| Polymer | A | B | C | D | E | F | G | H | I |
| EHA | 85 | 72 | 85 | 73 | 98 | 79 | 83 | 88 | 77 |
| BA | — | 5 | | 8 | | | | | 5 |
| HBA | 2 | 2 | 2 | 3 | | 1 | 2 | 2 | 2 |
| HEA | 5 | 10 | 3 | 4 | 2 | 5 | 15 | 5 | 10 |
| DMAA | 3 | 6 | 9 | 10 | | | | | 6 |
| DAAA | | | | | | | | | |
| PEGMA | 5 | 5 | 5 | 2 | | 15 | | 5 | |

Content unit: parts by weight
Solid content unit: wt %
Viscosity unit: cP
EHA: 2-ethylhexyl acrylate
BA: butyl acrylate
HBA: 4-hydroxybutyl acrylate
HEA: 2-hydroxyethyl acrylate
DMMA: dimethyl acrylamide
DAAA: diacetone acrylamide
PEGMA: polyethyleneglycol monomethylether methacrylate (ethyleneoxide unit added mole number: 9 mol)

Example 1. Preparation of Pressure-Sensitive Adhesive Composition

A pressure-sensitive adhesive composition was prepared by uniformly mixing 5.0 parts by weight of a mixture (MHG-80B, Asahi Kasei Chemicals Corporation (AKCC)) of an isophorone diisocyanate-based crosslinking agent and a hexamethylene diisocyanate-based crosslinking agent as a crosslinking agent and 0.5 part by weight of lithium bis(trifluoromethanesulfonyl)imide (LiTFSi) relative to 100 parts by weight of the acrylic polymer (A) of Preparation Example 1, and diluting the resulting mixture to have a suitable concentration in consideration of coatability.

Preparation of Pressure-Sensitive Adhesive Sheet

A uniform coating layer was formed to have a thickness of approximately 20 μm by coating and drying the prepared pressure-sensitive adhesive composition on one surface of a poly(ethylene terephthalate) (PET) film (thickness: 38 μm). Subsequently, the coating layer was maintained at approximately 90° C. for 3 minutes to induce a crosslinking reaction, thereby preparing a pressure-sensitive adhesive sheet.

Example 2 to 4 and Comparative Examples 1 to 5

Pressure-sensitive adhesive compositions were prepared by the same method as described in Example 1, except that component ratios of the respective pressure-sensitive adhesive composition were changed as shown in Tables 2 and 3.

TABLE 2

| | | Example | | | |
|---|---|---|---|---|---|
| | | 1 | 2 | 3 | 4 |
| Polymer | Type | A | B | C | D |
| | Ratio | 100 | 100 | 100 | 100 |
| Crosslinking agent | Ratio | 5 | 6 | 5 | 6 |
| Li salt | Ratio | 0.5 | 0.5 | 0.5 | 0.5 |

Ratio unit: parts by weight
Type of Crosslinking agent: mixture of isophorone diisocyanate-based crosslinking agent and hexamethylene diisocyanate-based crosslinking agent (MHG-80B, AKCC)
Type of Li salt: lithium bis(trifluoromethanesulfonyl)imide (LiTFSi)

TABLE 3

|  |  | Comparative Example | | | | |
|---|---|---|---|---|---|---|
|  |  | 1 | 2 | 3 | 4 | 5 |
| Polymer | Type | E | F | G | H | I |
|  | Ratio | 100 | 100 | 100 | 100 | 100 |
| Crosslinking agent | Ratio | 5 | 5.5 | 7 | 5 | 6 |
| Li salt | Ratio | 0.5 | 0.5 | 0.5 | 0.5 | 0.5 |

Ratio unit: parts by weight
Type of crosslinking agent: mixture of isophorone diisocyanate-based crosslinking agent and hexamethylene diisocyanate-based crosslinking agent (MHG-80B, AKCC)
Type of Li salt: lithium bis(trifluoromethanesulfonyl)imide (LiTFSi)

Physical properties were evaluated with respect to the pressure-sensitive adhesive compositions of Examples and Comparative Examples, and summarized in Tables 4 and 5.

TABLE 4

|  | Example | | | |
|---|---|---|---|---|
|  | 1 | 2 | 3 | 4 |
| Pot life | ○ | ○ | ○ | ○ |
| L-peel(unit: gf/25 mm) | 5.3 | 9 | 5.5 | 11 |
| H-peel(unit: gf/25 mm) | 130 | 200 | 130 | 180 |
| ESD(unit: kV) | 0.15 | 0.2 | 0.15 | 0.3 |
| Staining evaluation | ○ | ○ | ○ | ○ |

L-peel: low speed peel-off strength
H-peel: high speed peel-off strength

TABLE 5

|  | Comparative Example | | | | |
|---|---|---|---|---|---|
|  | 1 | 2 | 3 | 4 | 5 |
| Pot life | ○ | X | X | ○ | ○ |
| L-peel | 2.3 | 2.7 | 7 | 2 | 5.5 |
| H-peel | 100 | 110 | 210 | 120 | 210 |
| ESD | 0.7 | 0.3 | 0.45 | 0.9 | 0.3 |
| Staining | X | ○ | X | X | ○ |

L-peel: low speed peel-off strength
H-peel: high speed peel-off strength
ESD (unit: kV)

What is claimed is:

1. A surface protective film comprising:
    a surface protective base layer; and
    an antistatic pressure-sensitive adhesive layer formed on one or both surfaces of the base layer, and comprising a pressure-sensitive adhesive composition in a crosslinked state, where the pressure-sensitive adhesive composition, having a low speed peel-off strength measured at a peeling angle of 180° and a peeling speed of 0.3 m/min with respect to an adherent having a surface energy of 30 mN/m or less is 1 to 40 gf/25 mm and high speed peel-off strength measured at a peeling angle of 180° and a peeling speed of 30 m/min with respect to an adherent having a surface energy of 30 mN/m or less is 10 to 150 gf/25 mm comprises:
    an acrylic polymer comprising polymerization units of: 0.1 to 6.0 parts by weight of a monomer of Formula 1, 1 to 15 parts by weight of a dialkyl (meth)acrylamide, and 12 to 20 parts by weight of a hydroxyl group-containing monomer;
    an ionic compound; and
    a crosslinking agent;

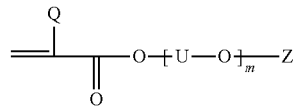

[Formula 1]

where Q is hydrogen or an alkyl group having 1 to 4 carbon atoms, U is an alkylene group having 1 to 4 carbon atoms, Z is hydrogen, an alkyl group having 1 to 4 carbon atoms, or an aryl group having 6 to 20 carbon atoms, and m is a number of 1 to 12,
wherein the hydroxyl group-containing monomer comprises 0.1 to 15 parts by weight of a first monomer represented by Formula 2, in which an alkylene group of A and B has 1 to 3 carbon atoms, and 0.1 to 5 parts by weight of a second monomer represented by Formula 2, in which an alkylene group of A and B has 4 to 8 carbon atoms, and wherein a weight ratio (A/B) of the first monomer in the acrylic polymer and the second monomer in the acrylic polymer is in a range of from 4 to 10,

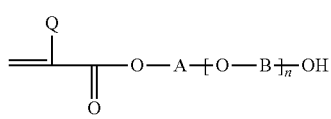

[Formula 2]

where Q is hydrogen or an alkyl group having 1 to 4 carbon atoms, A and B may be each independently an alkylene group, and n is a number of 0 to 10,
and wherein the crosslinking agent is an aliphatic isocyanate crosslinking agent.

2. The surface protective film according to claim 1, wherein the ionic compound is an inorganic salt or an organic salt.

3. The surface protective film according to claim 1, wherein the aliphatic isocyanate crosslinking agent is at least one selected from aliphatic cyclic isocyanate compound or an aliphatic non-cyclic isocyanate compound.

4. The surface protective film according to claim 3, wherein the aliphatic cyclic isocyanate compound is an isocyanate compound selected from isophorone diisocyanate, methylene dicyclohexyl diisocyanate, or cyclohexane diisocyanate; a dimer and trimer of the isocyanate compound; or a reaction product of the isocyanate compound with a polyol.

5. The surface protective film according to claim 3, wherein the aliphatic non-cyclic isocyanate compound is an alkylene diisocyanate compound having 1 to 20 carbon atoms; a dimer or trimer of the isocyanate compound; or a reaction product of the isocyanate compound with a polyol.

6. The surface protective film according to claim 1, wherein the crosslinking agent is comprised at 0.01 to 20 parts by weight relative to 100 parts by weight of the polymer.

7. An optical device comprising the surface protective film according to claim 1.

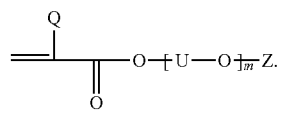

8. A display device comprising the optical device of claim 7.

9. The surface protective film according to claim 1, wherein the ratio (H/L) of the high speed peel-off strength (H) and the low speed peel-off strength (L) is from 1 to 15.

* * * * *